May 10, 1960  T. S. TUTWILER ET AL  2,936,300
COPOLYMERS OF VINYL ACETATE AND FUMARATE
Filed Nov. 16, 1955
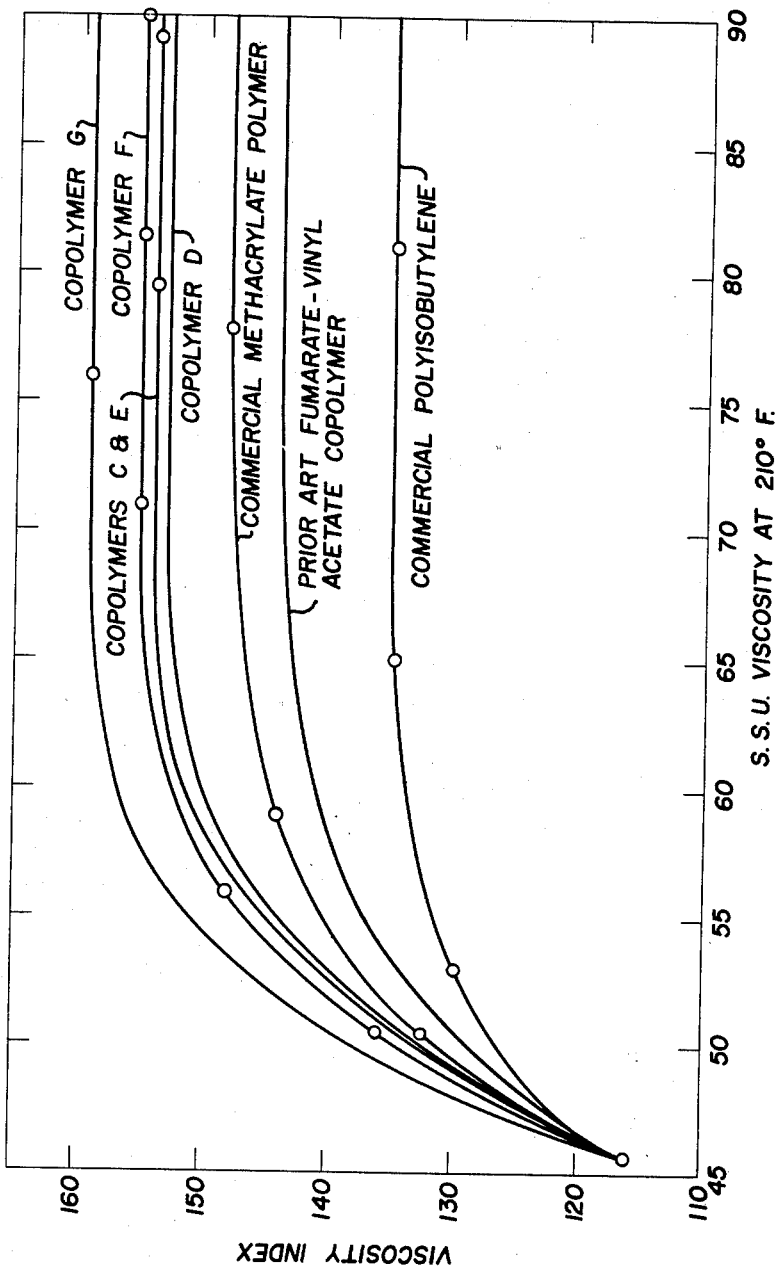
Thomas S. Tutwiler
William C. Hollyday, Jr.   Inventors
By K. M. LeFever   Attorney

United States Patent Office 2,936,300
Patented May 10, 1960

2,936,300
COPOLYMERS OF VINYL ACETATE AND FUMARATE

Thomas S. Tutwiler, Watchung, and William C. Hollyday, Jr., Fanwood, N.J., assignors to Esso Research and Engineering Company, a corporation of Delaware Application November 16, 1955, Serial No. 547,117

5 Claims. (Cl. 260—78.5)

This invention relates to novel chemical products and to their preparation and uses. More particularly, the invention relates to high molecular weight, oil-soluble copolymers of vinyl acetate with a dialkyl fumarate mixture consisting essentially of long chain dialkyl fumarate and di-isopropyl fumarate. These novel copolymers are especially useful for improving the pour point and viscosity index of oils, such as mineral lubricating oils, into which they are incorporated.

It has heretofore been suggested to make lubricating oil additives by polymerization of several different types of unsaturated esters, and some copolymers have been suggested. However, many types of copolymers are, for one reason or other, unsatisfactory; for instance, some are insoluble in lubricating oils, especially highly paraffinic oils, and some are soluble but are inferior as pour depressants and/or viscosity index improvers.

Broadly speaking, the present invention comprises the production of copolymers of vinyl acetate with a dialkyl fumarate mixture wherein the dialkyl fumarate mixture contains an average of about 9 to 11 carbon atoms per alkyl group and wherein the mixture consists essentially of (1) di-isopropyl fumarate and (2) long chain dialkyl fumarate having 10 to 22 carbon atoms in each alkyl group. The copolymers of the present invention are superior with respect to their pour depressancy and viscosity index improvement properties as compared to those copolymers suggested in the prior art.

PREPARATION OF DIALKYL FUMARATE MIXTURE

As stated above, the dialkyl fumarate mixture employed in preparing the novel copolymers of this invention has an average of about 9 to 11 carbon atoms per alkyl group and consists essentially of (1) di-isopropyl fumarate and (2) long chain dialkyl fumarate having 10 to 22 carbon atoms in each alkyl group. The dialkyl fumarate mixture thus has an average molecular weight within the range of about 360 to 425. Preferred copolymers are those prepared from a dialkyl fumarate mixture containing an average of about 10 carbon atoms per alkyl group. The preferred copolymers are those prepared using long, straight-chain dialkyl fumarates having 10 to 18 carbon atoms in each alkyl group.

In the preparation of the dialkyl fumarate mixture, each of the two dialkyl fumarate components, namely, the di-isopropyl fumarate and the long chain dialkyl fumarate, are formed separately and then subsequently mixed prior to the copolymerization. More specifically, di-isopropyl fumarate is prepared by direct esterification of fumaric acid with iso-propyl alcohol, and the long chain dialkyl fumarate is separately prepared by direct esterification of fumaric acid with alcohol containing in the range of 10 to 22 carbon atoms per molecule or mixtures thereof. If desired, esterification catalysts such as sulfonic acid, toluene sulfonic acid, sulfosalicilic acid or sodium bi-sulfate and water entrainers such as hexane, heptane or benzene may be employed. Generally, temperatures in the range of about 80° to 130° C. are useful and the esterification reaction will be complete in a period of about 8 to 35 hours. Generally, approximately stoichiometric proportions of alcohol and fumaric acid (i.e., 2 moles of alcohol per mole of acid), will be employed, although in certain instances it may be preferable to employ a slight stoichiometric excess, e.g. 3% of one of the reactants. The direct esterification technique is well understood in the art and need not be described in further detail herein.

The long chain alcohols useful in this invention are preferably straight chain, saturated, primary alcohols, particularly when the copolymer is to be used as a pour depressant. Examples of long chain alcohols which are useful in preparing the long chain dialkyl fumarate component of the dialkyl fumarate of this invention include the following: decyl, dodecyl, tetradecyl, cetyl, stearyl, arachidyl and behenyl. In addition to the above-mentioned long chain alcohols, it will be understood that mixtures thereof may be employed if desired. Many commercial alcohols are actually mixtures of a number of individual alcohols and such alcohol mixtures containing 10 to 22 carbon atoms per molecule may be employed and are preferred in this invention. Alcohol mixtures containing in the range of about 10 to 18 carbon atoms per molecule are especially preferred. The following long-chain alcohol mixtures are particularly preferred: (1) a mixture of $C_{14}$ to $C_{18}$ substantially-saturated, straight chain, primary alcohols, at least 95 weight percent being $C_{16}$ to $C_{18}$ alcohols; and especially (2) a mixture of $C_{10}$ to $C_{18}$ substantially-saturated, straight chain, primary alcohols containing about 1 to 5 weight percent of $C_{10}$ alcohol, about 54 to 65 weight percent of $C_{12}$ to $C_{14}$ alcohol and about 34 to 45 weight percent of $C_{16}$ to $C_{18}$ alcohol (the ranges are inclusive). Particularly useful commercial alcohol compositions have the following approximate compositions:

| Component Alcohol | Weight, Percent | |
|---|---|---|
| | Coconut Alcohol [1] | Tallow Alcohol [2] |
| $C_{10}$ | 2.5 | |
| $C_{12}$ | 55.5 | |
| $C_{14}$ | 21.0 | 3.0 |
| $C_{16}$ | 10.2 | 28.0 |
| $C_{18}$ | 10.8 | 69.0 |
| | 100.0 | 100.0 |

[1] Obtained by the hydrogenation of coconut oil. A mixture of substantially-saturated, straight chain, primary alcohols.
[2] Obtained by the hydrogenation of tallow (beef). A mixture of substantially-saturated, straight chain, primary alcohols.

Mixtures of these two commercially available alcohols may be employed. Preferred mixtures are those containing a weight ratio of coconut alcohol to tallow alcohol in the range of about 1.4:1.0 to 2.0:1.0.

The di-isopropyl fumarate and the long chain dialkyl fumarate are blended together in the dialkyl fumarate mixture of this invention in proportions such as to give a fumarate composition which averages in the range of about 9 to 11 carbon atoms per alkyl group in the mixture, or expressed in another way, the proportions of the fumarates are selected to give a fumarate mixture which has an average molecular weight in the range of about 360 to 425. Dialkyl fumarate mixtures averaging about 10 carbon atoms per alkyl group are particularly preferred. Generally about 0.7 to 1.5 moles, and preferably about 1.1 to 1.4 moles, of the short chain dialkyl fumarate will be employed per mole of long chain dialkyl fumarate in forming the dialkyl fumarate mixture.

POLYMERIZATION OF VINYL ACETATE WITH THE DIALKYL FUMARATE MIXTURE

The proportions in which the two reactants, namely, the vinyl acetate and the dialkyl fumarate mixture, are copolymerized may be varied over a fairly wide range. For example, the mole ratio of alkyl fumarate mixture to vinyl acetate may be in the range from 1/1 to 1/2, preferably, about 1/1.2 to 1/1.5, which generally corresponds to a weight ratio in the range from 4/1 to 2/1. Copolymers of the vinyl acetate with the dialkyl fumarate mixture having molecular weights in the range of about 8,000 to 35,000, and preferably, about 12,000 to 25,000, are useful as combination viscosity index improvers and pour depressants. These copolymers are oil-soluble.

In carrying out the copolymerization, the two reactants may be mixed and the mixture then heated, preferably, employing a solvent or diluent, e.g., a white oil, and preferably with a small amount of catalyst, to a reaction temperature of about 50 to 125° C., preferably about 60 to 100° C., using, if necessary, either superatmospheric pressure or refluxing, to prevent loss of reactants by vaporization. Adequate cooling should be provided to absorb the heat of polymerization. It is often convenient, especially when employing relatively large proportions of vinyl acetate, to add the latter gradually rather than all at once, thus controlling polymerization rate. As catalyst, it is found suitable to use about 0.1 to 5.0%, for example, 1.0% by weight of a peroxide such as benzoyl peroxide, acetyl peroxide, t-butyl hydroperoxide, t-butyl perbenzoate, etc. Some of the mineral oil solvent may be present at the start of the copolymerization, but preferably most or all of the solvent oil, is added stepwise during the copolymerization. The course of the copolymerization is followed and the copolymer molecular weight is measured by viscosity measurements. Generally, the diluent or solvent is added in increments such as to maintain the viscosity of the reaction mixture below about 50 poises, e.g., 3 to 40 poises, until the diluent concentration reaches about 60 to 70 wt. percent. Addition of the diluent oil may be started after the polymerization induction period of about 1 to 2 hours.

The reaction time will vary for instance from about 3 to 100 hours, usually from about 5 to 15 hours, varying inversely with the temperature. The molecular weight should be from about 1,000 to 50,000, but preferably, from about 3,000 to 30,000 for best results from a pour depressing point of view. When employed as viscosity index improvers, copolymer molecular weights from about 12,000 to 25,000 are preferred. Molecular weight is measured by the method of Staudinger, using the constant for isobutylene. The molecular weight may be controlled by the addition of a copolymerization inhibitor such as a phenolic anti-oxidant when the desired molecular weight is reached, and to some extent by use of a solvent or diluent, such as n-heptane or other inert liquid such as petroleum ether, refined naphtha, kerosene, lubricating oil, etc., copolymers of higher molecular weights being obtained with lesser amounts of solvent.

During the copolymerization it is preferred to exclude oxygen or air by any suitable means such as by blowing the reaction mixture or the reaction vessel with an inert gas such as nitrogen or carbon dioxide. Preferably, the copolymers are initially prepared, having molecular weights higher than ultimately desired, and then their molecular weights are reduced by homogenization. For example, copolymers are initially prepared, having molecular weights of about 20,000 to 25,000. These are then homogenized until their molecular weights are reduced to about 15,000 to 18,000.

The copolymers of this invention may be used as lubricating oil additives, in concentrations ranging, for instance, from about 0.01% to 10.0% by weight, or more. Generally, from about 0.05% to 0.5% is sufficient when pour depressing is the primary object, and a larger concentration, for example, from 0.5% to 5% when V.I. improvement is the primary object. The oil base stock in which the copolymers may be used may be not only the paraffinic mineral oils which require pour depressors, but also naphthenic or mixed base mineral lubricating oils which are desired to be improved in viscosity index, or blends of various types of oils where substantial improvements in both pour depressing and V.I. improvement are desired. The copolymers may also be used in greases which contain metal soaps, or in paraffin wax or waxy compositions, or in lighter liquid hydrocarbon oil products such as diesel fuel base stocks, which are often highly paraffinic in nature and require pour depressing, or other light oils such as domestic heating oil base stocks, mineral seal oil, refined kerosene and the like.

In preparing the lubricating oil or other compositions containing the novel copolymers of this invention, one may also add other conventional additives such as dyes, anti-oxidants (e.g., phenyl α naphthylamine), etc., or one may add other types of pour depressors such as the wax-naphthalene condensation product previously referred to or others such as a wax-phenol condensation product, as well as other viscosity index improvers such as polybutene, polyacrylates, e.g., poly lauryl methacrylate, polyvinyl ethers, polyvinyl esters, etc.

It is convenient in many instances to prepare additive concentrates consisting essentially of the copolymers of this invention and a diluent mineral oil such as a mineral lubricating oil. In such instances the additive concentrate will contain in the range of about 10 to 50% by weight, based on the total additive concentrate, of the copolymers of this invention. If desired, other additives such as detergents (e.g. barium tert. octyl phenol sulfide), oxidation inhibitors and the like may be added also to these additive concentrates. In using these additive concentrates, an amount of the additive concentrate is merely added to a lubricating oil composition in proportions sufficient to provide the desired amount of copolymer in the final lubricating oil composition.

The invention will be more fully understood by reference to the following example. It is pointed out, however, that the example is given for the purpose of illustration only and is not to be construed as limiting the scope of the present invention in any way.

EXAMPLE

A number of vinyl acetate-fumarate copolymers were prepared as follows:

Copolymers of the prior art

COPOLYMER A ($C_8$–$C_{18}$ (AVE. $C_{18.5}$) FUMARATE-VINYL ACETATE COPOLYMER)

(1) *Preparation of fumarate.*—One mole of fumaric acid was esterified with 2 moles of a mixture of $C_8$ to $C_{18}$ alcohols, having an average molecular weight of 207 (straight chain primary alcohols derived from coconut oil), using sulfuric acid as the esterification catalyst. Heptane was used as an entraining agent. The amount of water collected was about 102% of the theoretical and the amount of fumarate ester monomer recovered after thorough water washing was 98% of the theoretical.

(2) *Preparation of copolymer.*—Eighty grams of the fumarate ester prepared above (0.16 mole) and 20 g. of distilled vinyl acetate (0.23 mole) were copolymerized at 70° C. with benzoyl peroxide as the catalyst. The catalyst (1 g.) was added in increments during the reaction time of about 10 hours. The solvent (mineral oil of 43 SUS at 210° F. and 113 V.I.) was added during and after the copolymerization so that the final blend contained 20 wt. percent copolymer and had a viscosity of 543.7 SUS at 210° F. This corresponds to a Staudinger molecular weight of about 13,000. This product was tested as a pour depressant and V.I. improver as shown in Tables III and VI.

COPOLYMER B (DECYL (C₁₀) FUMARATE-VINYL ACETATE COPOLYMER)

The decyl fumarate ester and the copolymer were made similarly to copolymer A. The ester monomer was, of course, made from decyl alcohol. This copolymer was also tested as a pour depressant and V.I. improver with the results given in Tables III and VI.

Copolymers of the present invention

The copolymers of the present invention were prepared employing a mineral oil diluent which was added stepwise as the copolymerization proceeded. At the start, the reaction mixture consisted of fumarate and vinyl acetate monomers only. This mixture was brought to the reaction temperature (60°–75° C.) and a catalyst, benzoyl peroxide (about 0.05 to 0.2% based upon the monomers), was added to start the copolymerization. More catalyst was added during the reaction in increments to maintain a steady copolymerization rate, and the diluent oil was also added in increments to maintain the viscosity during most of the reaction time in the range of 3 to 40 poises at the reaction temperature. The reaction was finished when the mixture contained 60 to 70% blend oil and the viscosity reached 10 to 150 poises. Concentrations and viscosities in these ranges were selected according to the copolymer molecular weight desired. The copolymerization was stopped at the desired point and the product was stabilized by adding a phenolic, amino or sulfur-containing inhibitor.

COPOLYMER C

A mixture containing 1.42 moles of vinyl acetate to one mole of total fumarate was copolymerized as described above. The fumarate composition was as follows: 39.8 mole percent isopropyl, 1.3 mole percent decyl, 24.4 mole percent dodecyl, 8.7 mole percent tetradecyl, 9.4 mole percent hexadecyl and 16.4 mole percent octadecyl (prepared by mixing 20 parts by weight of isopropyl, 50 parts of coconut, and 30 parts of tallow fumarates). The reaction mixture was diluted during the copolymerization with a white oil having a viscosity of 42.1 SUS at 210° F. The total catalyst used was 0.8% based upon the total monomers, and the reaction time was 14 hours. At the end of the reaction 5% (based on the monomers) of a phospho-sulfurized terpene was added. The final product contained about 63.3% blend oil, 35% copolymer and 1.7% stabilizer, and had a viscosity of about 130 poises at the reaction temperature. The copolymer had a Staudinger molecular weight of about 18,000.

COPOLYMER D

This copolymer contained 1.39 moles of vinyl acetate to one mole of fumarate. The fumarate composition was as follows: 51.2 mole percent isopropyl, 1.7 mole percent tetradecyl, 14.7 mole percent hexadecyl and 32.4 mole percent octadecyl (prepared by mixing 26 parts of isopropyl fumarate with 74 parts of tallow fumarate). The copolymer was prepared by the method described above and had a molecular weight of about 22,000.

COPOLYMER E

This copolymer contained 1.36 moles of vinyl acetate to one mole of fumarates. The fumarate composition was as follows: 54.1 mole percent isopropyl, 1.6 mole percent tetradecyl, 13.8 mole percent hexadecyl and 30.5 mole percent octadecyl (27 parts isopropyl and 73 parts tallow fumarates). The copolymer was prepared by the method described above and had a molecular weight of about 16,000.

COPOLYMER F

This copolymer contained 1.36 moles of vinyl acetate to one mole of fumarate. The fumarate composition was as follows: 55.1 mole percent isopropyl, 1.6 mole percent tetradecyl, 13.5 mole percent hexadecyl and 29.8 mole percent octadecyl. The monomer ingredients used were 123 parts by weight isopropyl fumarate, 339 parts tallow fumarate and 138 parts vinyl acetate. The fumarates were separately prepared by esterifying one mole of fumaric acid with two moles of the alcohol, using toluene sulfonic acid as the catalyst and a mixture of hexane and heptane as an entraining agent to remove the water formed. The crude fumarate esters were purified by washing with water and alkaline solutions. The vinyl acetate used was a distilled commercial product.

The copolymerization was carried out in a 3-liter flask fitted with a stirrer, water cooled condenser, thermometer, nitrogen inlet tube, and a capillary tube used to determine the viscosity of the reaction mixture. The monomer ingredients were heated to 63° C. and 1 part benzoyl peroxide was added to start the copolymerization. The flask was briefly flushed with nitrogen after each addition of benzoyl peroxide catalyst. The exact schedule followed during the copolymerization is given in Table I.

TABLE I

*Preparation of copolymer F*

(600 parts by weight of monomer as described)

| Reaction Time, Hours | Temp., °C. | Catalyst Added, Parts | | Diluent Oil Added, Parts.[1] | | Reaction Mixture Viscosity, Poises |
|---|---|---|---|---|---|---|
| | | Increment | Total | Increment | Total | |
| 0 | 63 | 1.0 | 1.0 | 0 | 0 | <0.1 |
| 1 | 70 | 0.5 | 1.5 | 0 | 0 | 0.1 |
| 2.5 | 69 | 0.5 | 2.0 | 0 | 0 | 3 |
| 3 | 71 | 0.0 | 2.0 | 50 | 50 | 24 |
| 4 | 73 | 0.0 | 2.0 | 100 | 150 | 28 |
| 5 | 71 | 0.5 | 2.5 | 75 | 225 | 8 |
| 6 | 71 | 0.0 | 2.5 | 100 | 325 | 14 |
| 6.5 | 71 | 0.5 | 3.0 | 100 | 425 | 13 |
| 7 | 71 | 0.0 | 3.0 | 75 | 500 | 13 |
| 8 | 70 | 0.5 | 3.5 | 175 | 675 | 12 |
| 9 | 70 | 0.0 | 3.5 | 175 | 850 | 21 |
| 9½ | 70 | 0.0 | 3.5 | 150 | 1,000 | 25 |
| 11 | 69 | 0.0 | 3.5 | [2] 86 | 1,086 | 130 |

[1] A mineral white oil having a viscosity of 42.1 SUS at 210° F.
[2] Plus 30 parts of phospho-sulfurized terpene as a stabilizer.

The final reaction mixture, therefore, contained about 63.3 wt. percent blend oil, 35 wt. percent copolymer and 1.7 wt. percent stabilizer. This copolymer had a Staudinger molecular weight of about 16,000.

COPOLYMER G

This copolymer contained 1.50 moles of vinyl acetate to one mole of fumarate. The fumarate composition was as follows: 57.3 mole percent isopropyl, 1.5 mole percent tetradecyl, 12.8 mole percent hexadecyl and 28.4 mole percent octadecyl (31 parts isopropyl and 69 parts tallow fumarate). The copolymer was prepared by the method described and the molecular weight was about 13,000 Staudinger.

The copolymers of the present invention thus had the following compositions:

TABLE II

*Fumarate composition of copolymers*

| Alkyl Fumarate | Mole Percent Fumarate in Indicated Copolymer | | | | |
|---|---|---|---|---|---|
| | C | D | E | F | G |
| $C_3$ | 39.8 | 51.2 | 54.1 | 55.1 | 57.3 |
| $C_{10}$ | 1.3 | 0.0 | 0.0 | 0.0 | 0.0 |
| $C_{12}$ | 24.4 | 0.0 | 0.0 | 0.0 | 0.0 |
| $C_{14}$ | 8.7 | 1.7 | 1.6 | 1.6 | 1.5 |
| $C_{16}$ | 9.4 | 14.7 | 13.8 | 13.5 | 12.8 |
| $C_{18}$ | 16.4 | 32.4 | 30.5 | 29.8 | 28.4 |
| Ave. Mol. Wt. of Fumarate | 395 | 393 | 382 | 378 | 370 |

The aforedescribed seven copolymers were then evaluated for their viscosity index improvement properties in mineral oil, the results of which are shown below:

TABLE III

*V.I. improvement by fumarate-vinyl acetate copolymers*

| Copolymer | Fumarate Composition | Ave. M.W. of Fumarate | V.I. Ceiling in Test Oil A [1] |
| --- | --- | --- | --- |
| Prior Art: | | | |
| A | $C_8$–$C_{18}$ (Ave.$C_{13}$) Fumarate | 490 | 144 |
| B | Decyl ($C_{10}$) Fumarate | 396 | 148 |
| Present Invention: | | | |
| C | $C_3$+$C_{10}$ to $C_{18}$ (Ave.$C_{10}$) Fumarate | 395 | 154 |
| D | $C_3$+$C_{14}$ to $C_{18}$ (Ave.$C_{10}$) Fumarate | 393 | 153 |
| E | $C_3$+$C_{14}$ to $C_{18}$ (Ave.$C_{10}$) Fumarate | 382 | 154 |
| F | $C_3$+$C_{14}$ to $C_{18}$ (Ave.$C_{10}$) Fumarate | 378 | 155 |
| G | $C_3$+$C_{14}$ to $C_{18}$ (Ave.$C_{10}$) Fumarate | 370 | 159 |

[1] A Mid-Continent lube stock having a viscosity of 147.0 SUS at 100° F., 45.7 SUS at 210° F. and a V.I. of 113.0. The higher the V.I. ceiling, the more potent is the copolymer as a V.I. improver.

It will be seen above in Table III that the vinyl acetate-fumarate copolymers of the present invention were substantially superior to those of the prior art with respect to viscosity index improvement.

The V.I. improving potency of a polymer is most easily expressed as the V.I. ceiling in a given mineral oil base stock as shown in Table III. For example, in the oil used for testing V.I. improvers described in this application, commercial hydrocarbon polymers have a V.I. ceiling of about 135. Fumarate-vinyl acetate copolymers of the prior art have V.I. ceilings of 144 and 148. In contrast, copolymers of the present invention have V.I. ceilings of 155 or even higher. The full significance of these differences in V.I. potency may be illustrated better in terms of treating rates and efficiencies as shown in Table IV.

TABLE IV

*V.I. improver efficiency*

| Type Polymer | V.I. Ceiling—Test Oil A | Percent Relative Treating Rate [1] | Percent Relative Efficiency [1] |
| --- | --- | --- | --- |
| Hydrocarbon (Commercial) | 135 | 100 | 100 |
| Fumarate-Vinyl Acetate Copolymers of Prior Art | 144 | 70 | 143 |
|  | 148 | 58 | 173 |
| Fumarate-Vinyl Acetate Copolymers of Present Invention | 155 | 43 | 234 |

[1] Relative to commercial hydrocarbon polymer V.I. improver.

Of course, the relative treating rates and efficiencies given in Table IV apply to polymers and copolymers which all have the same molecular weight. V.I. ceilings are almost independent of molecular weight. These data mean that, to prepare a lubricating oil blend having a given viscosity and viscosity index, it will require only 43% as much of one of the copolymers of the present invention as of a commercial hydrocarbon polymer. Furthermore, it is possible to prepare higher V.I. oil blends with these new copolymers than was possible with the previously known V.I. improvers. The attached drawing shows the superiority of the present copolymers or V.I. improvers over prior art and commercial V.I. improvers.

The following table shows the viscosities and viscosity indices of the various copolymers of the present invention in a mineral lubricating oil (Test Oil A) at 3.6 wt. percent concentration.

TABLE V

|  | SUS/100° F. | SUS/210° F. | V.I. |
| --- | --- | --- | --- |
| Test Oil A | 174.0 | 45.7 | 113 |
| Test Oil A+C | 377.6 | 88.0 | 154 |
| Test Oil D | 432.2 | 100.3 | 153 |
| Test Oil E | 338.1 | 79.5 | 154 |
| Test Oil F | 336.0 | 81.4 | 155 |
| Test Oil G | 286.1 | 75.9 | 159 |

Copolymer C was then evaluated as a pour depressant in a number of mineral lubricating oils. For comparison purposes, copolymers A and B were also evaluated. The results are reported below:

TABLE VI

*Pour depression by fumarate-vinyl acetate copolymers*

| Copolymer | Pour Depressant Properties [1] | |
| --- | --- | --- |
|  | Sum 12 ASTM Pour Points, ° F. [2] | No. of Oil with Pour <−35° F. |
| Prior Art: | | |
| A | −195 | 0 |
| B | +155 | 0 |
| Present Invention: | | |
| C | −250 | 3 |

[1] Each copolymer was tested at 1 wt. percent concentration in 12 test oils covering SAE grades from 5 W to 30 and derived from Mid-Continent, Pennsylvania, California, Canadian and Kuwait crudes. The algebraic sum of the natural pour points of these 12 oils is +155° F.
[2] In accordance with the standard ASTM procedure (ASTM-D-9-97-47), the pour points of those copolymer-oil blends having pour points below −35° F. were reported as −35° F. in these sums.

The results in Table VI show that copolymer C of the present invention is substantially superior as a pour depressant to copolymer A and B of the prior art. The combined viscosity index improvement (see Table III) and pour depressancy properties of copolymer C of the present invention make it a particularly outstanding lubricating oil additive.

It has also been found that copolymers D, E, F and G are excellent sludge inhibitors and dispersers when used in small concentrations (i.e. 0.001 to 0.01 wt. percent) in heating oils. The following data illustrate the effectiveness of copolymer E as a sludge inhibitor in a commercial mineral oil distillate heating oil:

TABLE VII

*Copolymer E in heating oil*

| Wt. Percent of Additive Conc.[1] in Blend | Accelerated Storage Stability (16 hrs. at 210° F.) |
| --- | --- |
|  | Mg. Sediment/600 gm. Oil |
| Base Heating Oil (ex additive) | 15.4 |
| 0.01% | 2.3 |
| 0.005% | 2.4 |
| 0.0025% | 11.2 |
| 0.00125% | 12.9 |

[1] 35% by weight of copolymer E and 65% by weight of white oil.
Copolymer A (of the prior art) when evaluated in the base heating oil produced 13.6 mg. of sediment at 0.01 wt. percent of additive concentrate and 14.4 mg. of sediment at 0.005 wt. percent of additive concentrate. Thus copolymer A was essentially ineffective as a sludge inhibitor in heating oil.

What is claimed is:

1. An oil-soluble copolymer of vinyl acetate with a dialkyl fumarate mixture, said copolymer having a Staudinger molecular weight in the range of about 8,000 to 35,000; wherein said dialkyl fumarate mixture averages about 9 to 11 carbon atoms per alkyl group, has an average molecular weight in the range of about 360 to 425, and consists essentially of (1) diisopropyl fumarate and (2) a long chain dialkyl fumarate having from 10 to 22 carbon atoms in each alkyl group, the molar ratio of said diisopropyl fumarate per mole of said long chain dialkyl fumarate being in the range of 0.7 to 1.5 moles and the molar ratio of said dialkyl fumarate mixture to vinyl acetate is in the range of about 1:1 to 1:2.

2. An improved method for preparing copolymers, particularly useful as viscosity index improvers for lubricating oils which comprises forming a monomer mixture of dialkyl fumarate with vinyl acetate; said dialkyl fumarate having an average molecular weight of about 360 to 425 and consisting essentially of (1) diisopropyl fumarate and (2) long chain dialkyl fumarates having from 10 to 22 carbon atoms in each alkyl group, the mole ratio of said diisopropyl fumarate per mole of said long chain dialkyl fumarate being 0.7 to 1.5 moles; copolymerizing the monomers at a temperature in the range of 50 to 125° C. in the presence of a peroxide polymerization catalyst while continuously adding an inert liquid mineral oil diluent to maintain the viscosity of the reaction mixture below about 50 poises until the reaction mixture contains about 60 to 70 weight percent of said liquid diluent.

3. A copolymer according to claim 1 wherein said dialkyl fumarate mixture averages about 10 carbon atoms per alkyl group.

4. A copolymer according to claim 1 wherein said long chain dialkyl fumarates has 10 to 18 carbon atoms in each alkyl group.

5. An oil-soluble copolymer of vinyl actate with a dialkyl fumarate mixture wherein said dialkyl fumarate mixture contains an average of about 10 carbon atoms per alkyl group and wherein said mixture consists essentially of (1) diisopropyl fumarate and (2) long chain dialkyl fumarate having 14 to 18 carbon atoms in each alkyl group, said long chain dialkyl fumarate being the diester products of fumaric acid and a mixture of substantially saturated, straight chain primary alcohols, containing at least about 95 wt. percent of $C_{16}$ to $C_{18}$ alcohol, the molar ratio of dialkyl fumarate to vinyl acetate being in the range of about 1:1.2 to 1:1.5, the Staudinger molecular weight of said colpolymer being in the range of about 12,000 to 22,000.

References Cited in the file of this patent

UNITED STATES PATENTS

| | | |
|---|---|---|
| 2,628,198 | Arundale et al. | Feb. 10, 1953 |
| 2,628,220 | Arundale et al. | Feb. 10, 1953 |
| 2,642,414 | Bauer et al. | June 16, 1953 |
| 2,694,685 | Bartlett | Nov. 16, 1954 |
| 2,721,877 | Popkin et al. | Oct. 25, 1955 |
| 2,721,879 | Popkin et al. | Oct. 25, 1955 |